US009810539B2

(12) United States Patent
Jang

(10) Patent No.: US 9,810,539 B2
(45) Date of Patent: Nov. 7, 2017

(54) METHOD, APPARATUS, AND COMPUTER PROGRAM PRODUCT FOR CORRELATING PROBE DATA WITH MAP DATA

(71) Applicant: HERE GLobal B.V., Eindhoven (NL)

(72) Inventor: Dongwook Jang, Lisle, IL (US)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 15/071,839

(22) Filed: Mar. 16, 2016

(65) Prior Publication Data

US 2017/0268887 A1  Sep. 21, 2017

(51) Int. Cl.
G01C 21/30 (2006.01)
G01C 21/34 (2006.01)

(52) U.S. Cl.
CPC .............. *G01C 21/30* (2013.01); *G01C 21/34* (2013.01)

(58) Field of Classification Search
CPC ..................................................... G01C 21/30
See application file for complete search history.

(56) References Cited

U.S. PATENT DOCUMENTS

| 8,639,654 B2* | 1/2014 | Vervaet ............... G01C 21/32 707/602 |
| 8,725,404 B2* | 5/2014 | Kmiecik ............... G01C 21/32 701/400 |
| 8,751,149 B2* | 6/2014 | Van Doorselaer ... G01C 15/002 701/408 |
| 2008/0319645 A1 | 12/2008 | Kumagai et al. |
| 2009/0228204 A1* | 9/2009 | Zavoli .................. G01C 21/30 701/532 |
| 2010/0299057 A1 | 11/2010 | Osafune et al. |
| 2011/0113155 A1 | 5/2011 | Kuznetsov et al. |
| 2012/0197839 A1 | 8/2012 | Vervaet et al. |
| 2014/0163875 A1 | 6/2014 | Mund et al. |
| 2014/0317124 A1 | 10/2014 | Kosuru et al. |

OTHER PUBLICATIONS

Karimi, Hassan A. et al.; "A Methodology for Predicting Performances of Map-Matching Algorithms"; J.D. Carswell and T. Tezuka (Eds): W2GIS 2006, LNCS 4295; pp. 202-213, 2006.

* cited by examiner

*Primary Examiner* — Adam Tissot
*Assistant Examiner* — Michael Berns
(74) *Attorney, Agent, or Firm* — Alston & Bird LLP

(57) ABSTRACT

A method is provided for partitioning probe data into a plurality of subsets, map matching a portion of the subsets and establishing a route based on the map-matched subsets of probe data. A method is provided that includes: receiving probe data points from a plurality of probes, where an uncertainty of the measurement of the probe data is a first distance; partitioning the probe data from the plurality of probes into subsets of probe data, where the subsets are created by ensuring each subset has probe data points that are at least two times the first distance apart from one another; performing map-matching on each subset of probe data; and establishing a route for each subset based on the map-matching of each subset of probe data. Establishing a route for each subset may include determining a route according to at least one of the shortest, fastest, or simplest routes.

20 Claims, 7 Drawing Sheets

METHOD, APPARATUS, AND COMPUTER PROGRAM PRODUCT FOR CORRELATING PROBE DATA WITH MAP DATA

TECHNOLOGICAL FIELD

An example embodiment of the present invention relates to correlating probe data with map data and, more particularly, to partitioning probe data into subsets and using a portion of the subsets for map matching and establishing a route.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. However, map features such as roadways and routes along roadways change with relative frequency and mapping services may struggle to keep up with the map feature changes considering there are millions of miles of roads and thousands of road projects altering traffic routes on a constant basis.

BRIEF SUMMARY

A method, apparatus, and computer program product are provided in accordance with an example embodiment for partitioning probe data into a plurality of subsets, map matching a portion of the subsets and establishing a route based on the map-matched subsets of probe data. In an example embodiment, a method is provided that includes: receiving probe data points from a plurality of probes, where an uncertainty of the measurement of the probe data is a first distance; partitioning the probe data from the plurality of probes into subsets of probe data, where the subsets are created by ensuring each subset has probe data points that are at least two times the first distance apart from one another; performing map-matching on each subset of probe data; and establishing a route for each subset based on the map-matching of each subset of probe data. Establishing a route for each subset may include determining a route according to at least one of the shortest, fastest, or simplest routes.

According to some embodiments, methods may include selecting a predetermined ratio of the subsets for use in establishing a chosen route, where the ratio is less than one. Establishing the chosen route may be performed according to the following formula:

$$\operatorname*{argmin}_{r_i} \sum_{j \neq i}^{m_x} D(r_i, r_j)$$

Where each subset is represented by m, a number of subsets used for establishing the chosen route is represented by x, routes are represented by r, and $D(r_i, r_j)$ is the calculated similarity between routes $r_i$ and $r_j$. Methods may include determining the uncertainty of the chosen route using the subsets not used in establishing the chosen route. The uncertainty may be determined according to the following formula:

$$\varepsilon = \frac{1}{m_y} \sum_{j=1}^{m_y} D(r_c, r_j)$$

Where $\epsilon$ is the uncertainty; y is the number of remaining subsets not used in establishing the chosen route; and $r_c$ is the chosen route. Methods may further include projecting all probe data points onto the chosen route.

Embodiments described herein may provide an apparatus having at least one processor and at least one memory including computer program code. The at least one memory and the computer program code may be configured to, with the processor, cause the apparatus to at least: receive probe data points from a plurality of probes, where an uncertainty of the measurement of the probe data is a first distance; partition the probe data from the plurality of probes into subsets of probe data, where the subsets are created by ensuring each subset has probe data points that are at least two times the first distance apart from one another; perform map-matching on each subset of probe data; and establish a route for each subset based on the map matching of each subset of probe data. Causing the apparatus to establish a route for each subset may include causing the apparatus to determine a route according to at least one of the shortest, fastest, or simplest routes.

According to some embodiments, the apparatus may be caused to select a predetermined ratio of the subsets for use in establishing a chosen route, where the ratio is less than one. Establishing the chosen route may be performed according to the following formula:

$$\operatorname*{argmin}_{r_i} \sum_{j \neq i}^{m_x} D(r_i, r_j)$$

Where each subset is represented by m, a number of subsets used for establishing the chosen route is represented by x, routes are represented by r, and $D(r_i, r_j)$ is the calculated similarity between routes $r_i$ and $r_j$. The apparatus may optionally be caused to determine the uncertainty of the chosen route using the subsets not used in establishing the chosen route. The uncertainty may be determined according to the following formula:

$$\varepsilon = \frac{1}{m_y} \sum_{j=1}^{m_y} D(r_c, r_j)$$

Where $\epsilon$ is the uncertainty; y is the number of remaining subsets not used in establishing the chosen route; and $r_c$ is the chosen route. The apparatus may further be caused to project all probe data points onto the chosen route.

Embodiments described herein may provide a computer program product having at least one non-transitory computer-readable storage medium having computer-executable program code portions stored therein. The computer-readable program code portions may include program code instructions configured to: receive probe data points from a plurality of probes, where an uncertainty measurement of the probe data is a first distance; partition the probe data from the plurality of probes into subsets of probe data, where the subsets are created by ensuring each subset has probe data points that are at least two times the first distance apart from one another; perform map-matching on each subset of probe data; and establish a route for each subset based on the map-matching of each subset of probe data. The program code instructions configured to establish a route for each subset may include program code instructions configured to cause the apparatus to determine a route according to at least one of the shortest, fastest, or simplest routes.

According to some embodiments, the computer program product may include program code instructions configured to select a predetermined ratio of the subsets for use in establishing the chosen route, where the ratio is less than one. The program code instructions configured to cause the apparatus to establish the chosen route may do so according to the following formula:

$$\underset{r_i}{\operatorname{argmin}} \sum_{j \neq i}^{m_x} D(r_i, r_j)$$

Where each subset is represented by m, a number of subsets used for establishing the chosen route is represented by x, routes are represented by r, and D ($r_i,r_j$) is the calculated similarity between routes $r_i$ and $r_j$. The computer program product may further include program code instructions configured to determine the uncertainty of the chosen route using the subsets not used in establishing the chosen route. The uncertainty may be determined according to the following formula:

$$\varepsilon = \frac{1}{m_y} \sum_{j=1}^{m_y} D(r_c, r_j)$$

Where $\varepsilon$ is the uncertainty; y is the number of remaining subsets not used in establishing the chosen route; and $r_c$ is the chosen route.

BRIEF DESCRIPTION OF THE DRAWINGS

Figure 1:
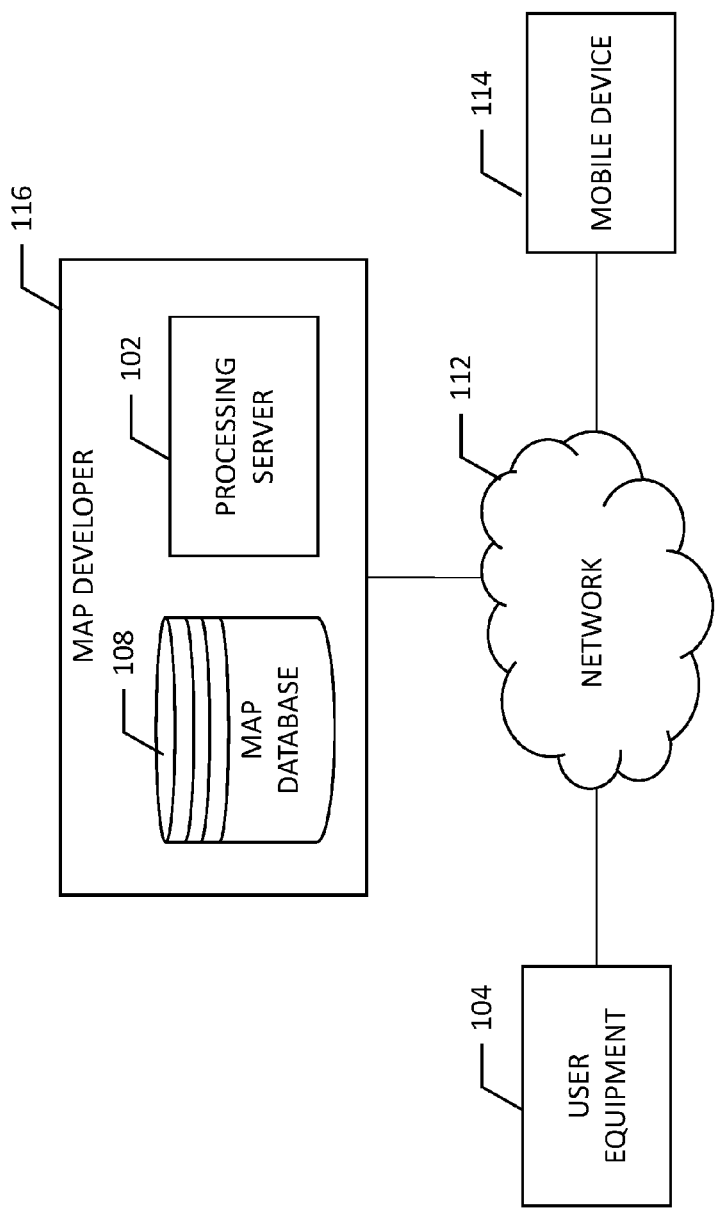
Figure 2:
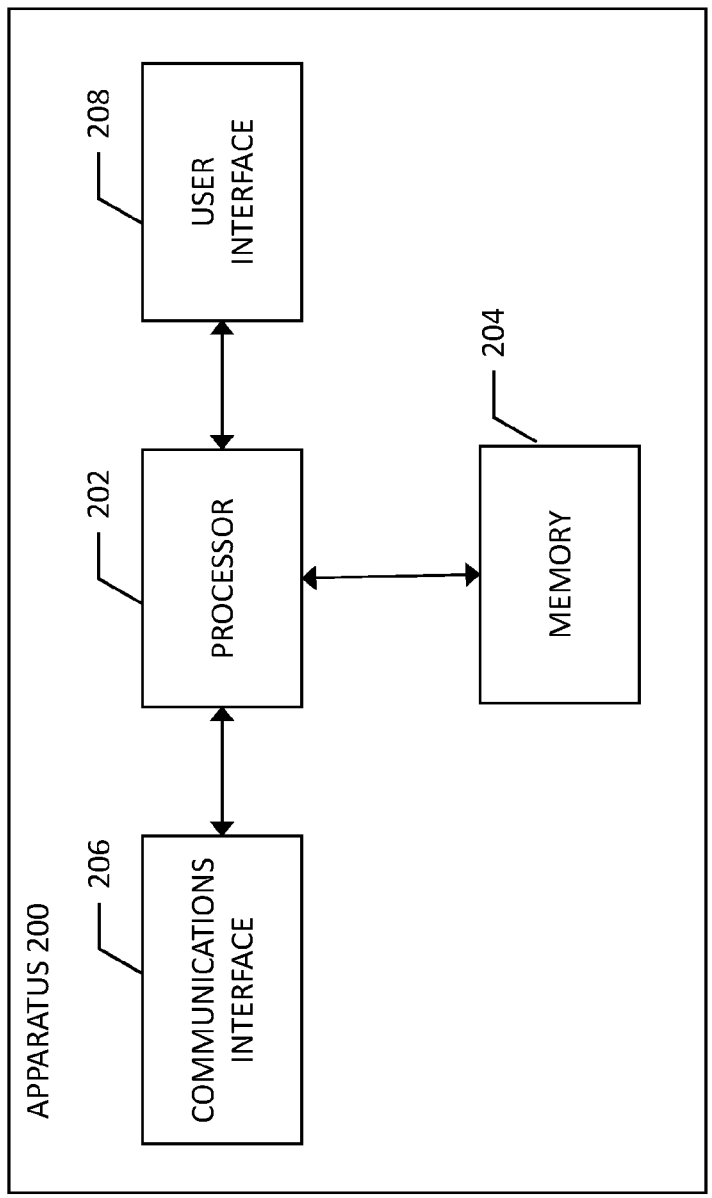
Figure 3:
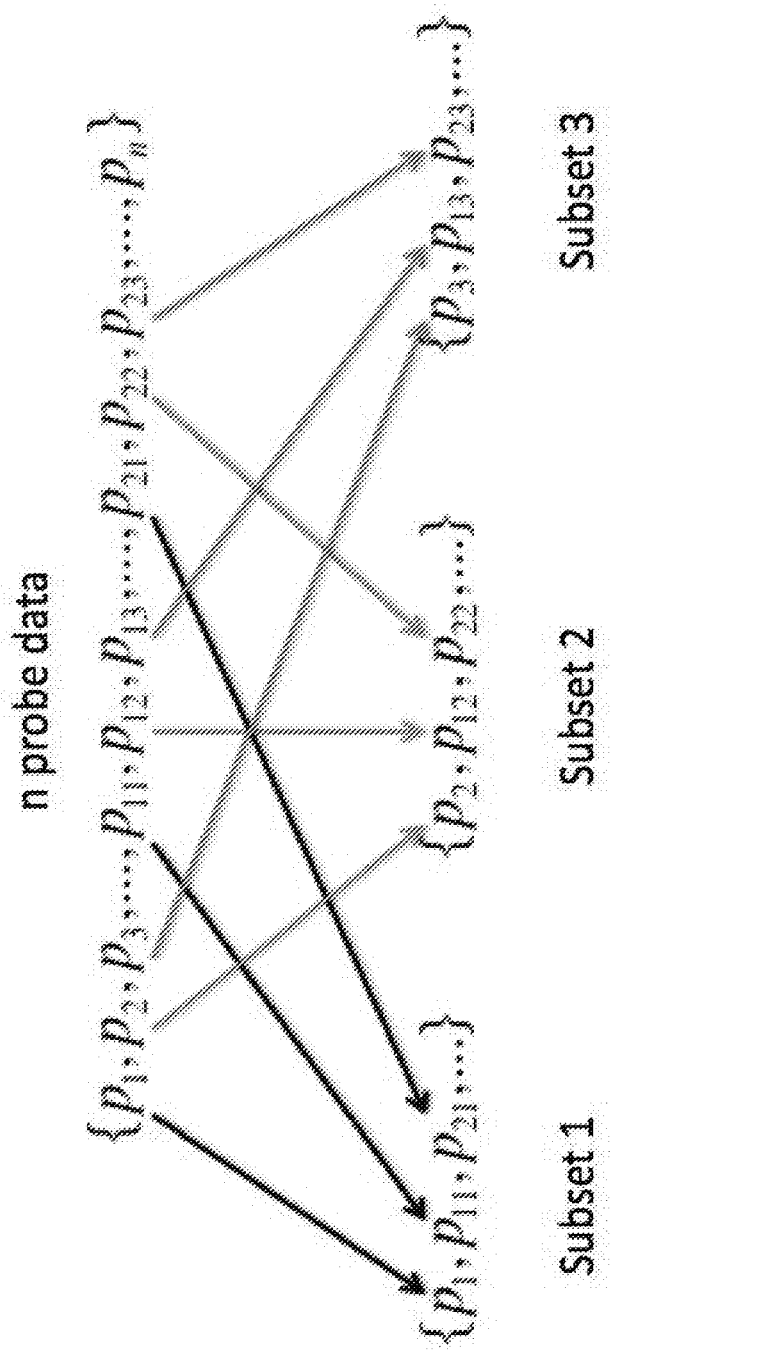
Figure 4:
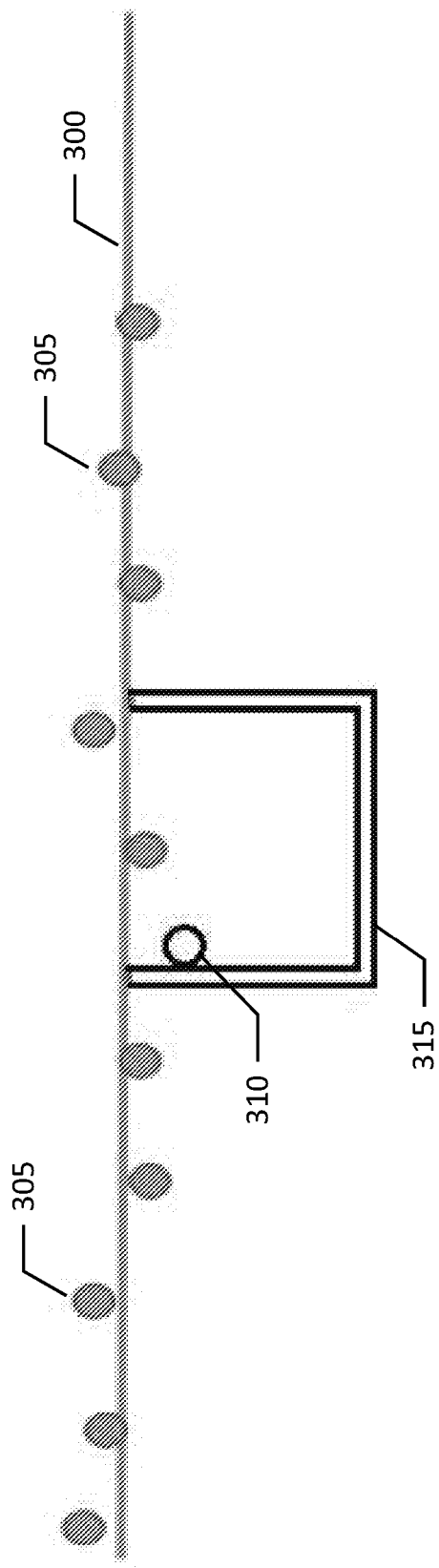
Figure 5:
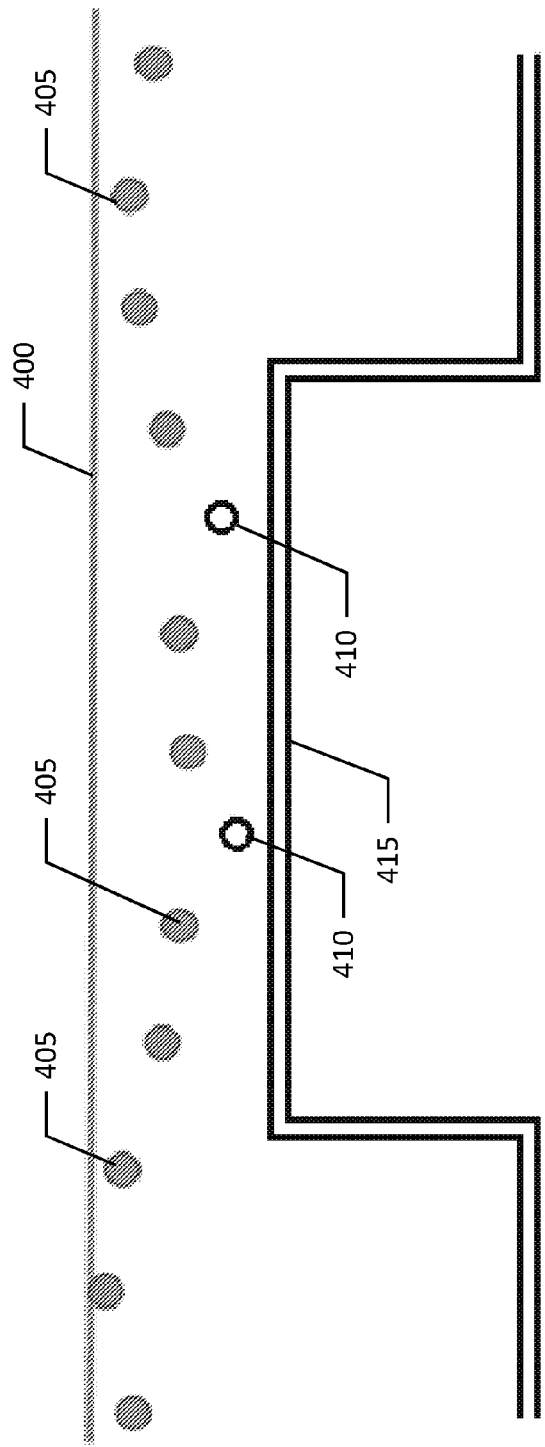
Figure 6:
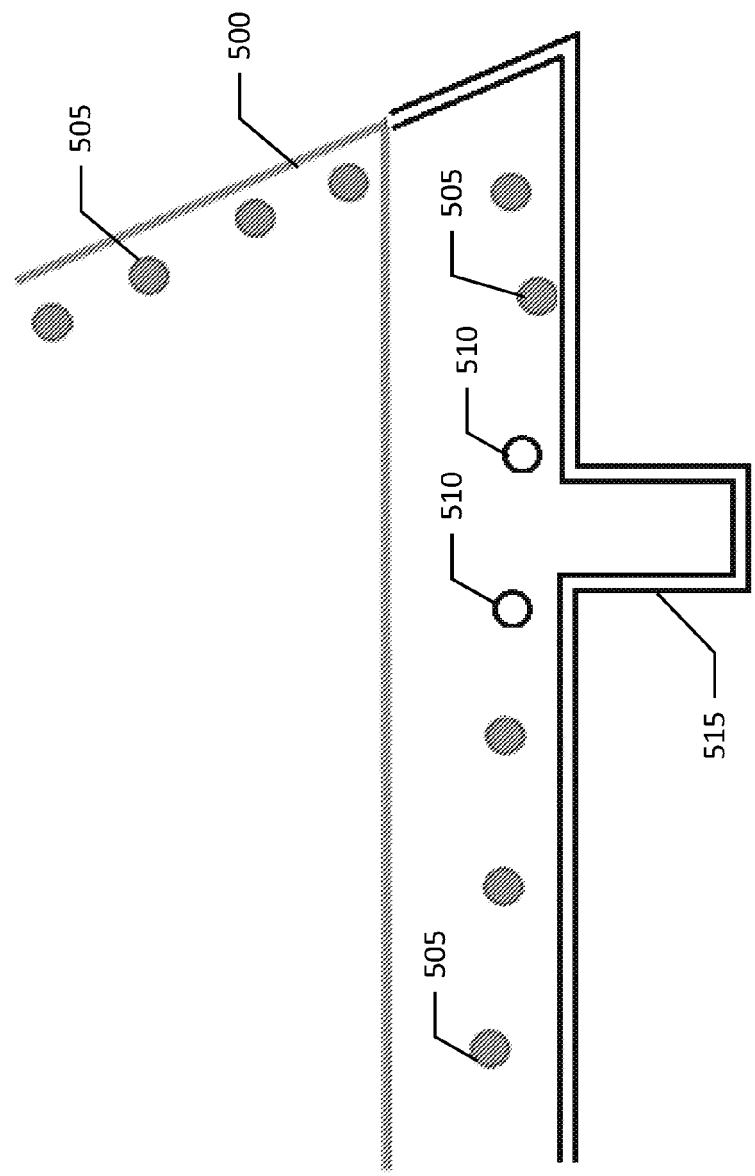
Figure 7:
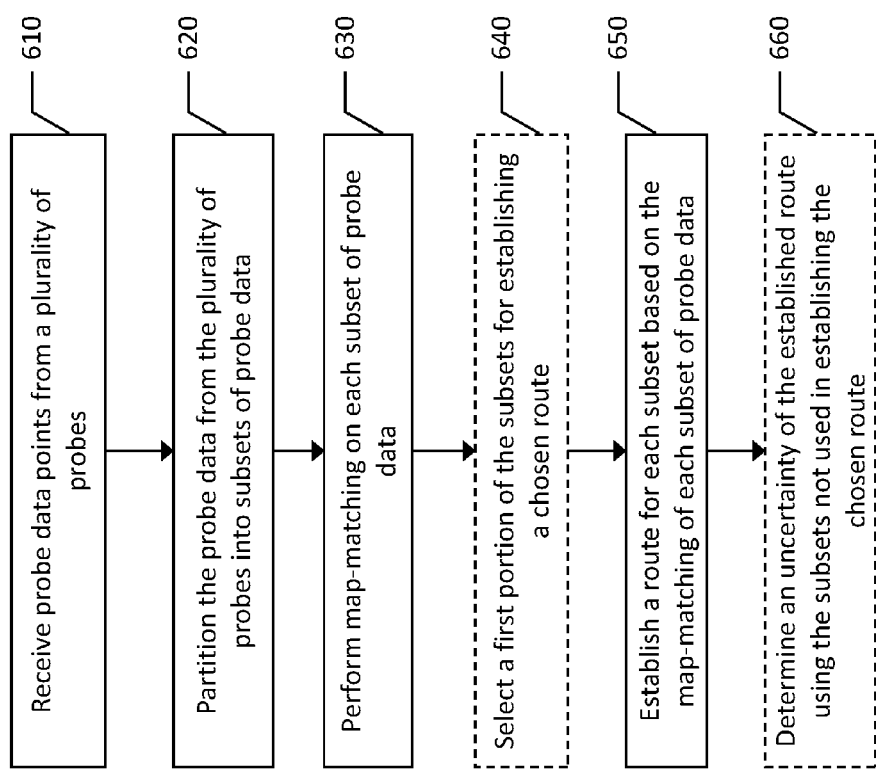

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for establishing a route from probe data points in accordance with an example embodiment of the present invention;

FIG. 3 illustrates the partitioning of probe data points into a plurality of subsets of probe data points according to an example embodiment of the present invention;

FIG. 4 illustrates probe data points collected and matched to a route according to an example embodiment of the present invention;

FIG. 5 illustrates probe data points collected and matched to another route according to an example embodiment of the present invention;

FIG. 6 illustrates probe data points collected and matched to still another route according to an example embodiment of the present invention; and FIG. 7 is a flowchart of a method for establishing a route and determining the uncertainty of the route according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for map matching probe data to a map geometry. FIG. 1 illustrates a communication diagram of an example embodiment of a system for implementing example embodiments described herein. The illustrated embodiment of FIG. 1 includes a map developer system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map developer 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for revising map geometry based on probe data received over two different periods of time. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by processing server 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an example embodiment of the present invention on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for matching probe data to a map, or "map matching" and establishing a route of the probe data. This map matching and route establishment may be used in a variety of applications, such as revising map information (e.g., stored in map database 108) using probe data (e.g., from mobile device 114) from a plurality of vehicles traveling along one or more roadways in a particular geographic region. Map information, such as paths of roadways, direction of traffic on said roadways, intersections, and the like may be stored, for example, in map database 108. As roadway infrastructure is subject to deterioration over time, road construction on existing roadways is an inevitable event that will alter roadways at least temporarily. Further, increases in population and vehicular traffic result in the need for new or expanded roadways, while other roadways may be removed or replaced. The term "roadways," as used herein, may refer to any path a vehicle may take in moving from one place to another. Roadways may be paved, improved roadways, gravel roadways, dirt trails, or the like, such that roadways does not imply that the mapped roads are necessarily recognized as county, state, or federally maintained roads, and may include private roadways such as access roads, neighborhood streets, and the like. As these roadways may change over the course of time, map information related to these roadways may require revision to keep up with the changes to the roadway paths.

Example embodiments described herein provide a mechanism to correlate collected probe data to a map geometry and establish routes related to the collected probe data. The method described herein collects a plurality of probe data points, partitions the probe data points into a plurality of subsets, and uses a portion of the subsets of probe data points for map matching. A route may further be established for reach subset based on the map matching of each subset of probe data points. A portion of the subsets of probe data points not selected for use in map matching may be used for evaluating the accuracy of the route established by the subsets of probe data points used in map matching.

As described above, example embodiments described herein may collect probe data from a plurality of probes across a geographic region. The geographic region may be user-defined or may be a region defined in an automated operation for canvassing an entire geographic area and mapping routes within regions of the geographic area periodically to ensure the accuracy of map data that may be stored, for example, in map database 108. The probe data collected may be collected over a predefined period of time, such as within a period of days, weeks, or months, depending upon the frequency of probe data availability for a region or route. Once collected, the probe data may be used according to example embodiments described herein to establish actual routes traveled by vehicles having generated the probe data.

Once probe data has been collected for the region of interest, the probe data is partitioned to create a plurality of subsets of probe data. The probe data includes an uncertainty measurement, which may be based on the uncertainty of location of the probe data or the accuracy of the probe data. For example, probe data may have an uncertainty of one meter in some embodiments. However, the uncertainty may vary and may be based on the specific uncertainty of probe data collected. A minimum integer may be established as two times the uncertainty distance measure, such that in the partitioning process, no two probe data points in a subset are closer than the minimum integer. FIG. 3 illustrates a plurality or "n" probe data points $p_1$ through $p_n$. The uncertainty measurement distance may be "u" such that the minimum integer value is 2*u (e.g., two meters when the uncertainty is one meter). The probe data may be divided into subsets such as Subset 1, Subset 2, and Subset 3, as shown in FIG. 3. The distance between probe data points in Subset 1, namely $p_1$, $p_{11}$, $p_{21}$, etc. is no less than 2*u. This type of subset determination will result in a plurality of subsets of the probe data collected for the region.

Once the probe data points are partitioned into subsets, a map-matching procedure may be performed on each subset. Various map-matching algorithms may be used to match the probe data point subsets to routes on a map. If gaps exist in the probe data points, such as where the distance between two closest probe data points is too large, the gaps may be filled through routing algorithms. Choices of routing algorithms to fill such gaps may be configurable among shortest, fastest, or simplest routes, for example.

Based on the map-matching algorithms performed on each of the plurality of subsets of probe data points, a plurality of routes, one corresponding to each subset, are established. The subsets may be partitioned such that a predetermined percentage of the routes are used to establish the most probable route, while the remaining routes may be used to evaluate the accuracy of the established route. According to an example embodiment, 70% of the routes (e.g., from 70% of the subsets) may be used to determine the most probable route. The ratio of routes used to determine the most probable route versus evaluation of the accuracy may be user configurable and may be varied in dependence of the available route density of an area, for example. In a region of sparse routes, such as in a rural area with relatively few roads, the percentage of routes used to determine the most probable route may be increased while the percentage of routes used to evaluate the accuracy may be decreased.

This may be due, in part, to a lower volume of probe data points available. In an urban region with dense available routes, the percentage of routes used to establish the most accurate route may be decreased while the percentage of routes used to evaluate the accuracy may be increased due to a higher likelihood of route errors and a higher volume of probe data points available.

Finding the most probable route may begin by defining the similarity between two routes. A goal may be to establish the route that is closest among all of the routes that are used to determine the most probable route. This similarity may be defined by the following equation:

$$D(r_1, r_2) = |d_1 - d_2| \quad [1]$$

Where $D(r_1,r_2)$ is the similarity between a first route $(r_1)$ and a second route $(r_2)$, while $d_1$ and $d_2$ are the total length of the first route $(r_1)$ and the second route $(r_2)$, respectively. The equation [1] above is illustrated as an example embodiment of determining a most probable route through a similarity determination. It is to be appreciated that various other similarity comparisons and calculations can be implemented without deviating from the scope of the invention described herein. Using this similarity definition, the most probable route may be chosen from the plurality of subsets used for finding the most probable route (e.g., 70% of the subsets) using the following equation:

$$\operatorname*{argmin}_{r_i} \sum_{j \neq i}^{m_x} D(r_i, r_j) \quad [2]$$

Where each subset is represented by m, a number of subsets used for establishing the route is represented by x, and D $(r_i, r_j)$ is the calculated similarity between routes $r_i$ and $r_j$. In an example embodiment where 10 subsets of probe data points are established from n probe data points, and the percentage of subsets used to establish the most probable route, m=10 and x=7.

The subsets of probe data points and the associated routes not used for determining the most probable route may be used to establish the uncertainty or accuracy of the chosen most probable route. The remaining subsets of probe data points and their associated routes may be used according to the following equation:

$$\varepsilon = \frac{1}{m_y} \sum_{j=1}^{m_y} D(r_c, r_j) \quad [3]$$

Where each subset is represented by m, a number of subsets used for establishing the accuracy or uncertainty is represented by y. In the example embodiment described herein, m=x+y. Further, $r_c$ represents the chosen most probable route from equation [2].

Once the most probable route is established and the uncertainty is calculated from the available subsets of probe data points, all of the probe data points may be projected onto the chosen route.

FIG. 4 illustrates an example implementation of route matching and establishment as described herein. According to the example embodiment of FIG. 4, the path of a vehicle is represented by line 300, with probe data points 305 collected along the route. Probe data points 305 are GPS locations correctly matched to the path 300. However, using conventional route matching practices, probe data point 310 may be matched to path 315, along which the vehicle did not travel. Example embodiments provided herein enable probe data point 310 to be correctly matched to path 300.

Similarly, FIG. 5 represents another example embodiment of probe data points 405 collected along a route 400 that are correctly matched to the route. However, according to conventional route matching techniques, probe data points 410 may be improperly matched to route 415 as they are closer to, or estimated to be closer to, route 415. According to example embodiments described herein, probe data points 410 would be correctly mapped to route 400.

FIG. 6 illustrates another example embodiment of probe data points 505 being correctly matched to the correct route of 500. However, the distance uncertainty of the probe data points, particularly probe data points 510, may cause the data points to be mapped to route 515 improperly. Example embodiments described herein avoid such route errors through the appropriate route establishment and the uncertainty calculation as described above.

FIG. 7 illustrates a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 7 illustrates a method of establishing a route based on a plurality of subsets of probe data points. At 610, probe data points from a plurality of probes may be received. At 620, the probe data points may be partitioned into subsets. The partitioning may be based on an uncertainty of the distance accuracy of each probe data point, where probe data points are grouped together into groups where no two probe data points are closer than twice the uncertainty of the distance accuracy value. At 630, each subset of probe data points may be matched to a map using map-matching techniques and algorithms. Illustrated at 640 in broken lines is an optional operation of partitioning the subsets, where a first portion of the subsets are used for establishing a route. The route is established from the subsets at 650 based on the map-matching of each subset of probe data points. Another optional operation illustrated in broken lines is depicted at 660 in which the subsets not used in establishing the route may be used to determine an uncertainty of the established route.

In an example embodiment, an apparatus for performing the method of FIG. 7 above may comprise a processor (e.g., the processor 202) configured to perform some or each of the operations (610-660) described above. The processor may, for example, be configured to perform the operations (610-660) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-660 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving probe data points from a plurality of probes, wherein an uncertainty of the measurement of the probe data is a first distance;
partitioning the probe data from the plurality of probes into subsets of probe data, wherein the subsets are created by ensuring each subset has probe data points that are at least two times the first distance apart from one another;
performing map-matching on each subset of probe data;
establishing a route for each subset based on the map-matching of each subset of probe data;
updating a map database with updated map information using a chosen route from each of the established routes; and
providing the updated map information for display to a user.

2. The method of claim 1, wherein establishing a route for each subset comprises determining a route according to at least one of the shortest, fastest, or simplest routes.

3. The method of claim 1, further comprising:
selecting a predetermined ratio of the subsets for use in establishing the chosen route, where the ratio is less than one.

4. The method of claim 3, wherein establishing the chosen route is performed according to the following formula:

$$\operatorname*{argmin}_{r_i} \sum_{j \neq i}^{m_x} D(r_i, r_j)$$

where each subset is represented by m, a number of subsets used for establishing the chosen route is represented by x, routes are represented by r, and $D(r_i, r_j)$ is the calculated similarity between routes $r_i$ and $r_j$.

5. The method of claim 4, further comprising:
determining an uncertainty of the chosen route using the subsets not used in establishing the chosen route.

6. The method of claim 5, wherein the uncertainty is determined according to the following formula:

$$\varepsilon = \frac{1}{m_y} \sum_{j=1}^{m_y} D(r_c, r_j)$$

wherein $\varepsilon$ is the uncertainty; y is the number of remaining subsets not used in establishing the chosen route; and $r_c$ is the chosen route.

7. The method of claim 1, further comprising: correlating all probe data points onto the chosen route.

8. An apparatus comprising at least one processor and at least one memory including computer program code, the at least one memory and computer program code configured to, with the processor, cause the apparatus to at least:
receive probe data points from a plurality of probes, wherein an uncertainty of the measurement of the probe data is a first distance;
partition the probe data from the plurality of probes into subsets of probe data, wherein the subsets are created by ensuring each subset has probe data points that are at least two times the first distance apart from one another;
perform map-matching on each subset of probe data;
establish a route for each subset based on the map-matching of each subset of probe data;
update a map database with updated map information using a chosen route from each of the established routes; and
provide the updated map information for display to a user.

9. The apparatus of claim 8, wherein causing the apparatus to establish a route for each subset comprises causing the apparatus to determine a route according to at least one of the shortest, fastest, or simplest routes.

10. The apparatus of claim 8, wherein the apparatus is further caused to:

select a predetermined ratio of the subsets for use in establishing the chosen route, where the ratio is less than one.

11. The apparatus of claim 10, wherein causing the apparatus to establish the chosen route is performed according to the following formula:

$$\underset{r_i}{\operatorname{argmin}} \sum_{j \neq i}^{m_x} D(r_i, r_j)$$

where each subset is represented by in, a number of subsets used for establishing the chosen route is represented by x, routes are represented by r, and $D(r_i, r_j)$ is the calculated similarity between routes $r_i$ and $r_j$.

12. The apparatus of claim 11, wherein the apparatus is further caused to:
determine an uncertainty of the chosen route using the subsets not used in establishing the chosen route.

13. The apparatus of claim 12, wherein the uncertainty is determined according to the following formula:

$$\varepsilon = \frac{1}{m_y} \sum_{j=1}^{m_y} D(r_c, r_j)$$

wherein $\varepsilon$ is the uncertainty; y is the number of remaining subsets not used in establishing the chosen route; and $r_c$ is the chosen route.

14. The apparatus of claim 8, wherein the apparatus is further caused to correlate all probe data points onto the chosen route.

15. A computer program product comprising at least one non-transitory computer-readable storage medium having computer-executable program code portions stored therein, the computer-executable program code portions comprising program code instructions configured to:
receive probe data points from a plurality of probes, wherein an uncertainty of the measurement of the probe data is a first distance;
partition the probe data from the plurality of probes into subsets of probe data, wherein the subsets are created by ensuring each subset has probe data points that are at least two times the first distance apart from one another;
perform map-matching on each subset of probe data;
establish a route for each subset based on the map-matching of each subset of probe data;
update a map database with updated map information using a chosen route from each of the established routes; and
provide the updated map information for display to a user.

16. The computer program product of claim 15, wherein the program code instructions configured to establish a route for each subset comprise program code instructions configured to cause the apparatus to determine a route according to at least one of the shortest, fastest, or simplest routes.

17. The computer program product of claim 15, further comprising program code instructions configured to:
select a predetermined ratio of the subsets for use in establishing the chosen route, where the ratio is less than one.

18. The computer program product of claim 17, wherein the program code instructions configured to cause the apparatus to establish the chosen route do so according to the following formula:

$$\underset{r_i}{\operatorname{argmin}} \sum_{j \neq i}^{m_x} D(r_i, r_j)$$

where each subset is represented by m, a number of subsets used for establishing the chosen route is represented by x, routes are represented by r, and $D(r_i, r_j)$ is the calculated similarity between routes $r_i$ and $r_j$.

19. The computer program product of claim 18, further comprising program code instructions configured to:
determine an uncertainty of the chosen route using the subsets not used in establishing the chosen route.

20. The computer program product of claim 19, wherein the uncertainty is determined according to the following formula:

$$\varepsilon = \frac{1}{m_y} \sum_{j=1}^{m_y} D(r_c, r_j)$$

wherein $\varepsilon$ is the uncertainty; y is the number of remaining subsets not used in establishing the chosen route; and $r_c$ is the chosen route.

* * * * *

UNITED STATES PATENT AND TRADEMARK OFFICE
CERTIFICATE OF CORRECTION

| | |
|---|---|
| PATENT NO. | : 9,810,539 B2 |
| APPLICATION NO. | : 15/071839 |
| DATED | : November 7, 2017 |
| INVENTOR(S) | : Jang |

It is certified that error appears in the above-identified patent and that said Letters Patent is hereby corrected as shown below:

In the Claims

Column 15,
Line 14, approximately, "subset is represented by in" should read --subset is represented by $m$--.

Signed and Sealed this
Eighth Day of May, 2018

Andrei Iancu
*Director of the United States Patent and Trademark Office*